(12) United States Patent
Klendworth et al.

(10) Patent No.: US 6,656,995 B2
(45) Date of Patent: Dec. 2, 2003

(54) PROCESS FOR PRODUCING OLEFIN POLYMER COMPOSITES HAVING IMPROVED MELT STRENGTH

(75) Inventors: Douglas D. Klendworth, West Chester, OH (US); Mark K. Reinking, Mason, OH (US); Sameer D. Mehta, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 68 days.

(21) Appl. No.: 10/096,640

(22) Filed: Mar. 12, 2002

(65) Prior Publication Data

US 2003/0176553 A1 Sep. 18, 2003

(51) Int. Cl.$^7$ .................................................. C08L 3/34
(52) U.S. Cl. ........................ 524/445; 524/582; 524/570; 524/236; 523/333
(58) Field of Search ................................ 524/445, 236, 524/582, 570; 523/333

(56) References Cited

U.S. PATENT DOCUMENTS 5,578,672 A    11/1996    Beall et al. ................. 524/446

OTHER PUBLICATIONS

Hasegawa, N., et al.: "Preparation and Mechanical Properties of Polypropylene—Clay Hybrids Using a Maleic Anhydride–Modified Polypropylene Oligomer," *JAPS 67*, 87–92 (1998).

Lim, Y.T., et al.: "Phase Morphology and Rheological Behavior of Polymer–Layered Silicate Nanocomposites," *Rheol Acta 4*: 220–229 (2001).

Jeon, H.G., et al., "Morphology of Polymer/Silicate Nanocomposites," *Polymer Bulletin 41*: 107–113 (1998).

Ross, J.F., et al.: "An Improved Gas–Phase Polypropylene Process," *Ind. Eng. Chem. Prod. Res. Dev. 24*: 149–154 (1985).

Oya, A.: "Polypropylene–Clay Nanocomposites," *Polymer–Clay Nanocomposites*: Section 8: 151–172 (2000). John Wiley & Sons, Ltd.

Alexandre, M., et al.: "Polymer–Layered Silicate Nanocomposites: Preparation, Properties and Uses of a New Class of Materials," *Materials, Science and Engineering, 28*: 1–63 (2000).

Alexandre, M., et al.: "Preparation and Properties of Layered Silicate Nanocomposites Based on Ethylene Vinyl Acetate Copolymers." *Macromol. Rapid Commun. 22*: 643–646 (2001).

Akexandre, M., et al.: "One–Pot Preparation of Polymer/Clay Nanocomposites Starting from Na+ Montmorillonite. 1. Melt Intercalation of Ethylene–Vinyl Acetate Copolymer." *Chem. Mater.* 13: 3830–3832 (2001).

*Primary Examiner*—David W. Wu
*Assistant Examiner*—Rip A Lee
(74) *Attorney, Agent, or Firm*—Gerald A. Baracka; William A. Heidrich

(57) ABSTRACT

A process for producing olefin polymer composites having improved melt strength and other improved physical characteristics is provided. The process is a solution process wherein an organically modified clay is intimately incorporated, at low levels and without the use of compatibilizing agents, into an olefin polymer base resin.

22 Claims, No Drawings

PROCESS FOR PRODUCING OLEFIN POLYMER COMPOSITES HAVING IMPROVED MELT STRENGTH

BACKGROUND OF THE INVENTION

1. Field of the Invention

The invention relates to a process for producing olefin polymer composites having improved melt strength. The process is a solution process whereby an organoclay is incorporated into an olefin polymer base resin. Utilizing the process of the invention, it is possible to produce olefin polymer composites with improved melt strengths using low levels of organoclays and without the use of compatibilizing agents.

2. Description of the Prior Art

Olefin polymers are widely used for the production of film and sheet goods, fibers, molded goods, etc., utilizing a variety of known processes, such as extrusion and coextrusion, blow molding, injection molding, thermoforming and the like.

In extrusion processes, such as those used for the production of films, fibers and molded goods, the olefin polymer resins must have sufficiently low melt viscosity under the high shear conditions encountered in the extruder in order to have acceptable processability and achieve the high throughputs necessary for commercial operation. On the other hand, the resins must have sufficient melt strength after extrusion to prevent sagging/distortion of the extrudate before it is cooled below the resin melt point. High melt strength resins are therefore highly advantageous in these operations. They are particularly advantageous for the production of large thermoformed and blow molded articles. For example, blow molding resins suitable for production of small shampoo bottles may not have sufficient melt strength for the production of one-gallon milk jugs where the parison is substantially larger and heavier. High melt strength olefin polymer resins are also highly desirable for extrusion coating and foamed and sheet extrusion processes.

Whereas some types of olefin polymers, such as low density polyethylene (LDPE) and ethylene-vinyl acetate (EVA) copolymers, are generally regarded to have sufficient melt strength for most of the aforementioned applications, other olefin polymer resins, most notably polypropylene (PP), high density polyethylene (HDPE) and linear low density polyethylene (LLDPE) resins, are deficient in this regard. In fact, these latter types of resins are frequently subjected to post-reactor treatments, such as oxidation treatments during finishing, in order to raise the melt strength of the resins to acceptable levels. While such treatments are capable of increasing the melt strength of certain of these resins, it is often at the expense of other physical properties, e.g., environmental stress crack resistance.

It would be highly advantageous if the melt strength of polyolefin resins could be improved without the use of such post-reactor oxidation treatments. The goal of the present invention is to provide polyolefin composites which exhibit increased melt strength using a straightforward solution technique. It is a further objective to accomplish this using low levels of ammonium-modified clays and without the use of costly compatibilizing agents.

The use of organically modified clays, sometimes referred to as intercalates or organoclays, produced by a cation exchange reaction between the clay and an alkylammonium salt, is known in the prior art. Alkylammonium cations exchanged into and between the clay platelets increase the interlayer spacing between adjacent platelets and render the hydrophilic clays organophilic and thus more easily dispersed in polyolefin resins. Compared to conventional filled polyolefin compositions, polyolefins filled with the intercalated organoclays have improved physical properties at similar loading levels.

Compatibilizing agents are commonly employed to facilitate incorporation of modified clays into non-polar polymers, such as polyolefins, during melt compounding. Compatibilizers are generally maleic anhydride grafted polymers employed at a weight ratio of 3:1 (compatibilizer:organoclay). While polyolefin, composites have been prepared using ratios of compatibilizer to organoclay as low as 1:1, the lower ratios are generally considered to be less desirable and, therefore, are typically avoided. For example, Hasegawa, et al., in an article entitled *"Preparation and Mechanical Properties of Polypropylene-Clay Hybrids Using a Maleic Anhydride Modified Polypropylene Oligomer,"* JAPS 67, 87 (1998), observe that as the ratio of compatibilizer to organically modified clay is increased, the particles of the silicate layers become smaller and are dispersed more uniformly so that the reinforcement effect of the clays is increased.

Lim, et al., in their article *"Phase Morphology and Rheological Behavior of Polymer/Layered Silicate Nanocomposites,"* Rheol Acta 4: 220–229 (2001), report the fabrication of nanocomposites with organophilic modified clays and polyethylene base resins grafted with 0.8 weight percent maleic anhydride. The nanocomposites are formed by melt-mixing.

Nitrile copolymer and HDPE nanocomposites containing modified silicate fillers are disclosed by Jeon, et al., in *"Morphology of Polymer/Silicate Nanocomposites,"* Polymer Bulletin 41: 107–113 (1998). The HDPE polymer composites contain 20% dodecylamine-modified montmorillonite clay and are obtained by dissolving the HDPE and the modified clay in a co-solvent of xylene and benzonitrile and precipitating in tetrahydrofuran.

In copending application Ser. Nos. 09/947,836 and 10/027,742 propylene polymer composites and ethylene polymer composites having improved melt strength are obtained by incorporating, by melt blending, specific modified organoclays and compatibilizing agents at low compatibilizer levels and at low ratios of compatibilizer to modified clay. Certain ethylene-vinyl acetate copolymer (EVA) composites are obtained without the use of compatibilizing agents.

SUMMARY OF THE INVENTION

We have now discovered a solution process whereby it is possible to significantly improve the melt strength and other physical characteristics of olefin polymers by intimately incorporating 0.5 to 10 weight percent of an organically modified clay therein. The process comprises contacting an olefin polymer base resin, said olefin polymer base resin dissolved in an aromatic solvent and selected from the group consisting of ethylene homopolymers, propylene homopolymers, ethylene-propylene copolymers, ethylene-$C_{4-8}$ $\alpha$-olefin copolymers, propylene-$C_{4-8}$ $\alpha$-olefin copolymers, ethylene-vinyl $C_{2-4}$ carboxylate copolymers and ethylene-$C_{1-4}$ alkyl methacrylate copolymers, and an organically modified clay, said organically modified clay dissolved in an aromatic solvent and consisting of a smectite clay that has been ion-exchanged and intercalated with a quaternary ammonium ion of the formula

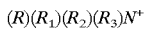

where R represents a $C_{18}$ alkyl substituent or mixture of alkyl substituents wherein $C_{18}$ alkyl moieties constitute 50 percent or more of the mixture and $R_1$, $R_2$, and $R_3$ are independently selected from the group consisting of R, H and $C_{1-22}$ hydrocarbyl; and evaporating said aromatic solvent to obtain an olefin polymer composite. The resulting olefin polymer composites preferably have from 1 to 7 weight percent, based on the total weight of the composite, of the organically modified clay intimately dispersed therein. Organically modified clays are preferably montmorillonite clays ion exchanged and intercalated with quaternary ammonium ions wherein the R group is comprised of at least 60 percent $C_{18}$ alkyl groups. Most preferably, the montmorillonite clay is modified with dimethyl dihydrogenated tallow ammonium ion.

Xylene and toluene are highly useful aromatic solvents. In one embodiment of the invention contacting the olefin polymer and organically modified clay is carried out at a temperature of 40° C. up to the boiling point of the solvent. Another aspect of the invention utilizes agitation during the contacting step.

Dissolution of the olefin polymer and organically modified clay may be accomplished in the same operation or as separate operations. High shear mixing may be advantageously utilized for dissolution of the organically modified clay and it may also be advantageous to utilize a polar activator compound with the organically modified clay. Recovery of the composite from the solution may be facilitated by precipitating the olefin polymer composite by the addition of a polar compound, such as acetone or methanol. In this way the bulk of the solvent can be removed by filtration or decantation prior to evaporation.

DETAILED DESCRIPTION

In accordance with the present invention, a process is provided whereby olefin polymer compositions referred to herein as composites, having increased melt strength are produced. Moreover, the process makes it possible to achieve enhanced melt strength and improve other physical properties utilizing low levels of organoclay and without a compatibilizing agent.

The increased melt strength or melt elasticity of the composites of the invention is evidenced by an increase or upturn in their dynamic rheological data at low frequencies. By increase or upturn is meant that the dynamic complex viscosity of the composites increases with decreasing frequencies at frequencies of less than about 1.0 rad/sec compared to the olefin polymer base resins which generally exhibit limiting constant values at frequencies of about <0.1 rad/sec. This complex viscosity increase or upturn, which is measured in terms of $\Delta G_o^*$, is an indication that the composites of the invention have superior melt strength compared to the base resins. Enhanced melt strength is also indicated by high complex viscosities ($\eta^*$) at low frequencies. The relative increase in complex viscosity of the composite as compared to the base resin is expressed by the ratio of complex viscosity of the composite to the base resin at a frequency of 0.1 radians/second.

$\Delta G_o^*$ is the difference, i.e., increase, in $G_o^*$ obtained for the composite material over the $G_o^*$ value observed for the olefin polymer base resin. It can be expressed by the equation:

$$\Delta G_o^* = (G_o^*)_{composite} - (G_o^*)_{base\ resin}$$

$\Delta G_o^*$ is expressed in dynes/cm². In general, the higher the $\Delta G_o^*$ value, the greater the improvement in melt strength of the composite over the base resin. The procedure used to measure the rheological properties of the base resins and composites and determine the viscosity upturn is detailed in the examples.

As will be recognized by those skilled in the art, specific $\Delta G_o^*$ values referred to herein are provided only to demonstrate the viscosity upturn, i.e., melt strength increase, for the composites of the invention and are not intended to be limiting since they are generated under a specific set of conditions. Rheological data generated using different conditions, e.g., temperature, percent strain, plate configuration, etc., could result in $\Delta G_o^*$ and complex viscosity ratio values which are higher or lower than those illustrated hereafter.

Olefin polymer resins utilized for the process of the invention include homopolymers and copolymers of ethylene and propylene and mixtures thereof More particularly, base resins utilized for the invention are ethylene homopolymers, propylene homopolymers, ethylene-propylene copolymers, ethylene-$C_{4-8}$ α-olefin copolymers, propylene-$C_{4-8}$ α-olefin copolymers, ethylene-vinyl $C_{2-4}$ carboxylate copolymers and ethylene-$C_{1-4}$ alkyl (meth) acrylate copolymers.

Representative ethylene homopolymers and ethylene-$C_{4-8}$ α-olefin copolymers include LDPE, LLDPE, HDPE, very low density polyethylene (VLDPE) and plastomers, medium density polyethylene (MDPE) and very high density or high and ultra high molecular weight polyethylene resins produced using known procedures, such as Ziegler, Phillips or metallocene polymerization processes.

EVA copolymers are representative of ethylene-vinyl carboxylate polymers which can be used and ethylene-ethyl acrylate (EEA) and ethylene-n-butyl acrylate (ENBA) copolymers are illustrative ethylene-alkyl acrylate copolymers.

Comonomer contents of the ethylene-$C_{3-8}$ α-olefin copolymers will typically range from 0.1 to 45 weight percent and, more preferably, from 0.5 to 40 weight percent. Vinyl acetate contents of EVA copolymers will typically range from 2 and 48 weight percent and, more preferably, from 4 to 45 weight percent. Acrylate monomer contents for the EEA and ENBA copolymers are typically from 1 to 48 weight percent and, more preferably, form 2.5 to 45 weight percent.

Propylene homopolymer, i.e., polypropylene, with varying degrees of isotacticity is also advantageously employed for the invention as are copolymers of propylene and ethylene wherein the comonomers are present in widely varying amounts. Such ethylene-propylene copolymers can include random, block and impact copolymers.

A particularly useful class of ethylene-propylene copolymers wherein propylene is the major comonomer typically containing 55 to 99.5 weight percent propylene and 0.5 to 45 weight percent ethylene. Even more preferred ethylene-propylene copolymers comprise 65 to 99.5 percent propylene and 0.5 to 35 percent ethylene. These weight percentages are for the overall propylene polymer compositions, so that if the composition is comprised of two or more different polymer components such as will be described in more detail to follow, the monomer contents of the individual polymer components comprising the blend may be outside the specified ranges.

In another highly useful embodiment of the process, propylene-ethylene copolymers comprised of two phases—a continuous phase of highly isotactic polypropylene homopolymer and a dispersed phase of rubber-like propylene-ethylene copolymer, are employed. Depending on the relative proportion of the continuous and disperse phases, these compositions are classified as either impact copolymers or thermoplastic polyolefins (TPOs)—the latter having a significantly higher rubber/elastomer content. Ethylene contents of these polymers will generally range from about 8 weight percent up to about 30 weight percent. While these types of copolymers can be produced by melt compounding individual polymer components, existing multi-reactor technology makes it possible to directly produce these products. This is conveniently accomplished, for example, by polymerizing propylene in a first reactor and discharging the polypropylene homopolymer from the first reactor into a secondary reactor where propylene and ethylene are copolymerized in the presence of the polypropylene. Gas-phase polymerizations of this type are described in the article by Ross, et al., "An Improved Gas-Phase Polypropylene Process." Ind. Eng. Chem. Prod. Res. Dev. 1985, 24, 149–154 which is incorporated herein by reference.

In still another highly useful embodiment, the process of the invention is utilized with HDPE and LLDPE resins to increase their melt strength, Especially useful HDPEs have densities in the range 0.941 g/cm$^3$ to 0.970 g/cm$^3$. Ethylene homopolymers having densities of 0.958 to 0.970 g/cm$^3$ and copolymers of ethylene and butene-1, hexene-1 or octene-1 having densities of 0.941 to 0.959 g/cm$^3$ are especially preferred. Especially useful LLDPE resins have densities from 0.912 to 0.940 g/cm$^3$ and, more preferably, from 0.915 to 0.935 g/cm$^3$ and contain one or more comonomers selected from the group consisting of butene-1, hexene-1 and octene-1. Densities reported herein are determined in accordance with ASTM D 1505.

The melt strength of resins produced using metallocene or single-site catalysts, which typically have low melt strength due to their narrow molecular weight distributions, may also be improved. An example of such ethylene polymer resins is the so-called plastomers and elastomers which have densities between 0.857 and 0.915 g/cm$^3$.

Organoclays employed for the process of the invention are smectite-type clays modified by reacting the clay with a quaternary ammonium ion, i.e., incorporating organic cations between the layers of the clay. The resulting cation exchanged clays exhibit organophilic character which facilitates dispersion in the olefin polymer resins.

Smectite clays are well known in the art as are the methods for modification with quaternary ammonium compounds. Representative natural smectite clays which can be employed include montmorillonite, bentonite, hectorite, saponite, beidellite and the like. Synthesized smectites, such as those synthesized by reacting magnesium silicates and alkali may also be employed. Montmorillonite clays and, more particularly, montmorillonite clays having exchange capacities of at least 50 milliequivalents per 100 grams of clay are preferred.

For the process of this invention, clays of the above types and particularly montmorillonite clays, are reacted with a quaternary ammonium compound having one or more $C_{18}$ alkyl substituents. More specifically, the quaternary ammonium ion corresponds to the formula:

$$(R)(R_1)(R_2)(R_3)N^+$$

where R represents a $C_{18}$ alkyl substituent or mixture of alkyl substituents wherein the $C_{18}$ alkyl moieties constitute 50% or more of the mixture. $R_1$, $R_2$ and $R_3$ are independently selected from the group consisting of R, H or a $C_{1-22}$ hydrocarbon group. Mixed alkyl substituents are typically obtained utilizing amines derived from natural sources such as beef tallow or mutton tallow. R moieties obtained from such natural sources correspond to the constituent fatty acids present therein which are typically mixtures of aliphatic radicals comprised of predominantly $C_{14-18}$ carbon atoms. The carbon number range and distribution within the carbon number range, i.e., percentage of each component, can vary depending on factors such as the tallow source, treatment and age of the tallow. Typical constituent fatty acid values have, however, been generated and are as follows:

| Constituent Fatty Acid | Beef Tallow | Mutton Tallow |
|---|---|---|
| Myristic ($C_{14}$) | 6.3% | 4.6% |
| Palinitic ($C_{16}$) | 27.4% | 24.6% |
| Stearic ($C_{18}$) | 14.1% | 31.5% |
| Oleic ($C_{18:1}$) | 49.6% | 36.0% |
| Linoleic ($C_{18:2}$) | 2.5% | 4.3% |

Source: CRC Handbook of Chemistry and Physics, 74$^{th}$ ed. (1993–94), pages 7–29.

Thus, when hydrogenated and even allowing for variations in tallow composition referred to above, it is expected that the $C_{18}$ alkyl substituents will comprise at least 60% by weight and, more typically, at least 65% by weight of the R groups. More specifically, it is anticipated R would be comprised of approximately 5% $C_{14}$, 30% $C_{16}$, and 65% $C_{18}$ alkykl groups.

Montmorillonite clays modified with dimethyl dihydrogenated tallow ammonium ion (abbreviated 2M2HT) and represented by the formula:

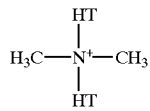

where HT represents the hydrogenated tallow group are particularly effective for the invention. Montmorillonite clays modified with dimethyl dihydrogenated tallow ammonium chloride at modifier concentrations of 50 to 150 meq/100 g can advantageously be used. Clays with modifier concentrations of 90 to 130 meq/100 g are particularly useful. Modified clays of this type are available from commercial sources at different modifier concentrations. For example, Southern Clay Products, Inc., offers several montmorillonite clay products modified to different levels with dimethyl dihydrogenated tallow ammonium chloride, including Claytone® HY, Claytone AF, Cloisite® 6A with a modifier concentration of 140 meq/100 g, Cloisite® 15A with a modifier concentration of 125 meq/100 g and Cloisite® 20A with a modifier concentration of 95 meq/100 g.

The process utilized to prepare the composites of the invention having improved melt strength involves dissolving the olefin polymer base resin and organically modified clay in an aromatic solvent and then recovering the composite by removing the solvent. One or more optional steps, which will be described in more detail to follow, may also be utilized and are advantageously employed with certain olefin polymers.

Aromatic solvents used for the process include benzene; alkyl-substituted benzenes such as toluene and xylene;

alkylidene-substituted benzenes such as styrene, halogentated benzenes such as dichloro- or trichlorobenzene; and the like. Toluene and xylene are especially useful. In most instances, the amount of aromatic solvent employed will be such that the combined weight percent of olefin polymer and organoclay in the aromatic solvent is 40 percent or less. More typically, the total concentration of the olefin polymer and organically modified clay in the aromatic solvent is from 1 to 25 weight percent and, most preferably, from 5 to 20 weight percent.

The weight ratio of olefin polymer to organoclay will be varied as necessary to achieve the desired amount of organoclay in the resulting composite. Composites obtained by the process of the invention will have 0.5 to 10 weight percent organically modified clay intimately dispersed therein. More preferably, the organoclay constitutes from 1 to 7 weight percent of the total weight of the composite.

Dissolution of the olefin polymer and organically modified clay in the aromatic solvent is accomplished by contacting the mixture until the particles of the base polymer starting resin are no longer visible. The resulting solution may be clear but, more typically, is translucent. While the clay may, strictly speaking, not be soluble in the aromatic solvent, the organically modified platelets are sufficiently dispersed in the solvent so that a "solution" is produced at the concentration limits specified, above. The organoclay and olefin polymer may both be added to the aromatic solvent and dissolved or separate solutions of the organoclay and olefin polymer may be prepared using the same or different aromatic solvents and these solutions subsequently combined. Also, dissolution of the organoclay and olefin polymer may be done in a step-wise manner. For example, the organically modified clay may first be added to the aromatic solvent and, after dissolution of the organoclay, the olefin polymer may be added and the dissolution operation continued until the olefin polymer is dissolved. This approach is particularly useful where it is desirable to utilize different conditions for dissolution of the organoclay and olefin polymer or where a polar activator is employed with the organoclay.

While dissolution can be effected at ambient temperatures, solution of the olefin polymer and organoclay is generally accomplished by heating these components, individually or in combination, in the aromatic solvent until solution is achieved. The time required to achieve dissolution can be as little as 10 minutes up to several hours depending on the temperature used, the aromatic solvent employed, the particular components being dissolved, the type and degree of mixing used, and other variables. When heat is used for dissolution, the temperature can range from just above ambient up to the boiling point of the solvent; however, most typically the temperature will be from about 40° C. up to the boiling point of the aromatic solvent. Heating under reflux is particularly advantageous. Once solution has been achieved, additional heating within reasonable limits is not detrimental. Dissolution and particularly dissolution with the application of heat can be advantageously carried out under an inert atmosphere of nitrogen or the like to minimize degradation of the olefin polymer.

Some form of mixing may also be advantageously employed during all or part of the dissolution operation. Mixing may be accomplished by tumbling on a roll mill or by mechanical agitation or the like. In one highly useful embodiment of the invention high shear agitation is employed for dissolution of the organically modified clay, either in the presence or absence of the olefin polymer. High shear mixing is particularly useful when the dissolution operation is conducted in a stepwise manner, first dissolving the organoclay and then adding the olefin polymer and completing the solution operation, either with conventional, i.e., low shear, agitation or high shear agitation.

For the purpose of the invention, agitator speeds of 1000 rpm or below are considered to be low shear or conventional mixing. High shear mixing utilizes stirrer speeds from about 1000 rpm up to about 100,000 rpm. In a preferred embodiment of the process which utilizes high shear mixing, agitator speeds from 4000 rpm to 20,000 rpm are employed.

As previously indicated, polar activators can be employed for dissolution, i.e., solvation of the organically modified clay. While the use of polar activators is not necessary for the process, it may be advantageous in some instances. Polar activators are known for this purpose and are defined as low molecular weight compounds of a polar nature. Most commonly employed polar activators are propylene carbonate, acetone, methanol and ethanol. When alcohols are employed they typically contain at least 5 percent water for maximum effectiveness. Neoalkoxy titanates are also sometimes used as activators. Illustrative activators of this type, also referred to as coupling agents, are neopentyl(diallyl)oxy, tri(dioctyl) pyro-phosphato titanate and neopentyl(diallyl)oxy, tri(N-ethylenediamino)ethyl titanate.

When polar activators are employed, they are necessarily utilized at concentrations which will not interfere with dissolution of the olefin polymer. Since, in one embodiment of the process, some of these same polar compounds are used to precipitate the composite from the aromatic solvent, the concentration of the polar activator used for solvation of the organoclay cannot be such that it will adversely affect the solubility limits of the olefin polymer and prevent it from completely going into solution with the organoclay, i.e., the ability to obtain a solution of the organically modified clay and olefin polymer. In general, the amount of polar activator used for solvation of the organoclay will not exceed 10 weight percent of the total solvent and, more preferably, will be from 0.1 to 3 weight percent.

After both the olefin polymer and organically modified clay are dissolved in the aromatic solvent, the composite is recovered by evaporating the aromatic solvent. This is conveniently accomplished by passing air or, more preferably, an inert gas such as nitrogen over and/or through the solution or pulling a vacuum on the solution. Removal of the aromatic solvent can be facilitated by heating the solution.

In an alternative embodiment, a sufficient volume of a polar compound is added to the solution to cause the composite to precipitate from the solution. The precipitated composite is then isolated by filtration or decanting and any solvent remaining with the composite evaporated. This is accomplished by air or vacuum drying or by passing air or an inert gas over or through the composite. Polar liquids typically added to the solution to precipitate the composite include acetone, methanol, ethanol and tetrahydrofuran.

In addition to having enhanced melt strength, composites produced in accordance with the process of the invention can exhibit other improved physical properties to the base resin. For example, propylene polymer composites can have improved stiffness and heat distortion and HDPE composites typically exhibit improved stiffness and environmental stress crack resistance.

Composites produced in accordance with the process of the invention may be advantageously used for a variety of applications including thermoforming, blow molding, extrusion coating and foamed and sheet extrusion. By using the composites it is possible to eliminate or reduce problems heretofore associated with certain olefin polymer base resins. For example, the upturn in complex viscosity and corresponding increase in melt strength obtained with the composites of the invention make it possible to increase parison hang times. This is highly advantageous when blow molding larger parts which require larger parisons. Also, in thick (0.25–1.5 inch) sheet extrusion processes where resins have a tendency to sag as they exit the die and before they contact the chill roll, use of the composite materials of the invention can eliminate or at least significantly reduce sagging and any operational problems associated therewith. Similar advantages can be realized when the composites of the invention are utilized in thermoforming and extrusion coating processes.

The following detailed examples illustrate the practice of the invention in its most preferred form, thereby enabling a person of ordinary skill in the art to practice the invention. The principles of this invention, its operating parameters and other obvious modifications thereof, will be understood in view of the following detailed procedure. All parts and percentages in the examples are on a weight basis unless otherwise indicated.

Rheological properties were determined using a Rheometrics ARES rheometer. Rheological data were generated by measuring dynamic rheology in the frequency sweep mode to obtain complex viscosities ($\eta^*$), storage modulus (G') and loss modulus (G") for frequencies ranging from 0.0251 to 398 rad/sec for each composition. The rheometer was operated at 210° C. with the propylene homopolymer and copolymer resins and at 150° C. with the polyethylene resins in parallel plate mode (plate diameter 50 mm) in a nitrogen environment (in order to minimize sample oxidation/degradation). Unless otherwise noted, the gap in the parallel plate geometry was 1.2–1.4 mm and the strain amplitude was 10 percent for the polyethylene and propylene copolymer resins and 20 percent for the polypropylene homopolymer. Rheological properties were determined using standard test procedure ASTM D 4440–84.

The measure of viscosity increase or upturn, $\Delta G_o^*$, of each composite was determined from the rheological data using a modified Casson plot of $\sqrt{G^*}$ vs $\sqrt{\omega}$ wherein $G^*$ is the absolute value of dynamic modulus and $\omega$ is the frequency. The five lowest frequency points for each data set were used to obtain an intercept value $G_o^*$ at $\omega=0$ by the linear extrapolation method. $\Delta G_o^*$ is the difference in $G_o^*$ between the composite and the base resin. It is a measure of the increased complex viscosity of the composite materials of the invention. $G_o^*$ and $\Delta G_o^*$ values provided for the examples are reported in dynes/cm².

EXAMPLE 1

To a 3-neck flask fitted with an overhead paddle-type stirrer, a nitrogen inlet and nitrogen outlet connected to a stirrer was added 2550 ml toluene (99%) and 19.15 g organoclay (Cloisite 15A having a modifier concentration of 125 meq/100 g). The mixture was stirred using a conventional paddle-type stirrer at a stirrer speed of 100–400 rpm until the organoclay was dissolved and a solution obtained. Three hundred (300) g LLDPE (ethylene-hexene-1 copolymer; MI 0.7 g/10 min; density 0.915 g/cm³) was then added and the mixture heated at 100° C. with stirring for approximately 3 hours. The solution was poured into pans and allowed to cool. After solidifying sufficiently, the polymer was sliced into strips and dried under vacuum at 70° C. to remove the remaining toluene. Rheological data for the resulting composite having approximately 6% of the organoclay intimately dispersed therein and LLDPE base resin are provided in Table 1. Based on the rheological data, a significant increase in melt strength was observed for the composite compared to the base resin.

COMPARATIVE EXAMPLE A

To demonstrate the significance of the above results, a composite was prepared utilizing the melt compounding procedure described in copending application Ser. No. 10/027,742. The same LLDPE and organoclay employed for Example 1 were used for this comparative example and the amount (6%) of organoclay in the base resin was the same. For the comparative example prepared using the melt compounding procedure it was also necessary to include 3% compatibilizing agent. In this case, the compatibilizing agent was an HDPE resin (MI 9.5 g/10 min) grafted with 2% maleic anhydride. The organoclay and compatibilizing agent were incorporated into the LLDPE using a masterbatch containing 50% modified clay and 25% compatibilizer in a carrier resin. The appropriate amount of masterbatch was dry blended with the LLDPE and the mixture then melt compounded using a ZSK-30 twin screw extruder (30 mm screw diameter; L/D 38.7). The temperature profile of the extruder was 180° C. (Zone 1); 210° C. (Zone 2); 220° C. (Zones 3 and 4); 230° C. (Zones 5 and 6); 220° C. (Zone 7); 190° C. (Zone 8; and 180° C. (Zone 9).

Rheological test results obtained for the melt compounded composite (set forth in Table 1) clearly indicate that, while some improvement in melt strength over the base resin was achieved, the improvement was only approximately half that achieved with the composite of Example 1 produced using the solution process of the invention. It should further be noted that in order to achieve even this limited improvement in melt strength using the melt compounding approach, it was also necessary to use a compatibilizing agent.

EXAMPLE 2

Fifty (50) grams polypropylene homopolymer (12 MFR) were added to a round bottom flask with 500 ml xylene and heated under a nitrogen atmosphere with stirring (approximately 100 rpm) until all of the polymer had dissolved, i.e., polymer particles were no longer visible. A solution of 3 g organically modified clay (Cloisite 20A having a modifier concentration of 95 meq/100 g) in 100 ml xylene was prepared by placing the ingredients in a round bottle and rolling the capped bottle for 1–2 hours on a roll mill. The resulting organoclay solution was then added to the olefin polymer solution in the flask and the contents stirred under reflux conditions for 2 hours. The polypropylene organoclay/xylene solution was then poured into a stainless steel tray, cooled and 500 ml acetone added to complete the precipitation of the composite. The liquid phase was decanted and the composite air-dried in a fume hood. The melt strength of the composite was greater than that of the polypropylene base resin as evidenced by the rheological data presented in Table 1.

EXAMPLE 3

To demonstrate the ability to vary the process conditions and, in doing so, further improve the melt strength of the olefin polymer composites, a propylene composite such as illustrated in Example 2 containing 6% organically modified clay was prepared. The base resin, organoclay and aromatic solvent employed were the same as in Example 2. Only the procedure used to prepare the organoclay/xylene solution was different. For this example, the organoclay (3 g) was combined with 100 ml xylene which were then mixed in a Hamilton Beach/Proctor-Silex food chopper at 500–1000 rpm for 1 minute. The mixture was then added to the polypropylene solution and the process continued as described in Example 2. The composite was recovered per the procedure of Example 1. Rheological data for the composite are set forth in Table 1 and show that the increase in melt strength is even greater than that obtained with the composite of Example 2.

EXAMPLE 4

Following the procedure of Example 2, a propylene copolymer composite was prepared and evaluated. The organically modified clay was the same as employed in Example 2; however, the propylene copolymer was an in-reactor produced two-phase propylene polymer reins having 19.5 percent ethylene copolymerized (9.5 MFR). The resulting composite had significantly increased melt strength as compared to the base resin. Rheological data for the composite and base resin are reported in Table 1.

EXAMPLE 5

A composite was prepared utilizing the propylene copolymer and organoclay of Example 4 following the high shear procedure of Example 3. For this example the solution of the propylene copolymer, organoclay and xylene were heated for 45 minutes at 103° C. before recovery of the composite. Rheological data obtained for the resulting composite (see Table 1) show a significant increase in melt strength compared to the base resin. In this case, the melt strength increase is substantially the same as obtained with the composite of Example 4.

COMPARATIVE EXAMPLE B

The following comparative examples are provided to further demonstrate the advantages of the process of the invention versus known melt compounding procedures and the ability to obtain increased melt strength without the use of compatibilizing agents. For this comparative example the propylene copolymer and organically modified clay of Example 4 were employed. The melt compounding procedure employed was the same as described for comparative Example A except that no compatibilizing agent was used and the temperature profile used for the extruder was 150° C. (Zone 1); 180° C. (Zone 2); and 190° C. (Zones 3–9). While the composite produced using the melt compounding procedure did produce some increase in melt strength over the propylene copolymer base resin, the melt strength increase obtained with composites containing identical levels of the same organically modified clay but produced using the solution process of the invention in Examples 4 and 5 showed significantly greater increase in melt strength based on the Theological data provided in Table 1.

EXAMPLE 6

When the general procedure of Example 1 was followed using 6% organoclay with the LLDPE similar results are obtained. In this example, 6.40 g organically modified clay (Claytone HY) was dissolved with conventional stirring in 1500 ml toluene. After the organoclay was dissolved 100 g LLDPE was added and the mixture heated and stirred 2¼ hours at 98° C. and the LLDPE composite recovered. Composites produced in accordance with the foregoing procedure exhibit increased melt strength.

EXAMPLE 7

Example 1 was repeated using HDPE (MI 6.6 g/10 min; density 0.953 g/cm³) and Claytone HY organically modified clay. For this procedure 19.2 g Claytone HY was first dissolved in 1500 ml. The HDPE (300 g) was then added to the clay/xylene solution and heating continued for 1½ hours at 117° C. until the HDPE was completely dissolved. The composite was recovered using the previously described procedure. HDPE composites produced in this manner exhibit improved melt strength.

EXAMPLE 8

Following the procedure of Example 3, 6.40 g of Claytone HY organically modified clay was dissolved in 1500 ml toluene utilizing a high shear mixer and with 4.04 ml added acetone. The resulting solution and 100 g LLDPE were combined and heated (98° C.) with stirring for 3 hours. The composite was recovered by evaporating the solvent under vacuum at 80° C. Composites obtained in this manner exhibit improved melt strength.

EXAMPLE 9

Following the procedure of Example 8, a HDPE composite was identically prepared except that xylene was employed as the solvent and the xylene/Claytone HY/HDPE solution was obtained by heating the mixture at 110° C. for 7 hours with stirring. The composite was obtained by evaporating the xylene under vacuum at 80° C. Composites produced in this manner have increased melt strength compared to the HDPE base resin.

EXAMPLES 10–12

A series of propylene copolymer composites were prepared in accordance with the procedure of Example 4. The copolymer used and procedure employed was the same as in Example 4; however, the organoclay used was Claytone AF and the organoclay loading was varied. Amounts of organoclay and copolymer used as well as the rheological test results (determined at 20% strain) for each of the composites are provided in Table 2.

EXAMPLES 13–15

Polypropylene homopolymer composites having improved melt strengths were prepared using amounts of organically modified clay (Claytone AF) varying from 2.4 to 9.1 weight percent and following the procedure set forth in Example 2. The amount of organoclay and polypropylene used for each composite is set forth in Table 2 along with the Theological data for each composite.

TABLE 1

| Product | $G_o^*$ | $\Delta G_o^*$ | $\eta^*$ ratio |
|---|---|---|---|
| Example 1 Composite | 5816 | 5573 | 1.34 |
| LLDPE Base Resin | 243 | 0 | 1.0 |
| Comparative Example A | 2507 | 2264 | 1.57 |
| Example 2 Composite | 293 | 277 | 2.0 |
| PP Base Resin | 16 | 0 | 1.0 |
| Example 3 Composite | 1725 | 1709 | 3.6 |
| Example 4 Composite | 4278 | 4178 | 5.3 |
| Propylene Copolymer Base Resin | 100 | 0 | 1.0 |
| Example 5 Composite | 4440 | 4340 | 5.4 |
| Comparative Example B | 577 | 477 | 1.5 |

TABLE 2

| Product | Weight Organoclay (g) | Weight Polymer (g) | $G_o^*$ | $\Delta G_o^*$ | $\eta^*$ ratio |
|---|---|---|---|---|---|
| Example 10 Composite | 1 | 40 | 997 | 897 | 1.8 |
| Example 11 Composite | 2 | 40 | 4122 | 4022 | 3.8 |
| Example 12 Composite | 4 | 40 | 15208 | 15108 | 11.3 |
| Example 13 Composite | 1 | 40 | 92 | 76 | 1.1 |
| Example 14 Composite | 2 | 40 | 635 | 619 | 2.0 |
| Example 15 Composite | 4 | 40 | 4141 | 4125 | 4.5 |

We claim:

1. A process for producing olefin polymer composites having increased melt strength comprising:
    (a) contacting an olefin polymer base resin, said olefin polymer base resin dissolved in or added to an aromatic solvent and selected from the group consisting of ethylene homopolymers, propylene homopolymers, ethylene-propylene copolymers, ethylene-$C_{4-8}$ α-olefin copolymers, propylene-$C_{4-8}$ α-olefin copolymers, ethylene-vinyl $C_{2-4}$ carboxylate copolymers and ethylene-$C_{1-4}$ alkyl methacrylate copolymers, and an organically modified clay, said organically modified clay dissolved or dispersed in an aromatic solvent and consisting of a smectite clay that has been ion-exchanged and intercalated with a quaternary ammonium ion of the formula $(R)(R_1)(R_2)(R_3)N^+$ where R represents a $C_{18}$ alkyl substituent or mixture of alkyl substituents wherein $C_{18}$ alkyl moieties constitute 50 percent or more of the mixture and $R_1$, $R_2$, and $R_3$ are independently selected from the group consisting of R, H and $C_{1-22}$ hydrocarbyl; and
    (b) evaporating said aromatic solvent to obtain an olefin polymer composite; said olefin polymer composite having from 0.5 to 10 weight percent, based on the total weight of the composite, of the organically modified clay intimately dispersed therein.

2. The process of claim 1 wherein the smectite clay is montmorillonite clay and R is comprised of at least 60 percent $C_{18}$ alkyl groups.

3. The process of claim 2 wherein the organically modified clay is montmorillonite clay modified with dimethyl dihydrogenated tallow ammonium ion and the modifier concentration is 50 to 150 meq/100 g.

4. The process of claim 1 wherein the olefin polymer base resin is a polypropylene homopolymer.

5. The process of claim 1 wherein the olefin polymer base resin is an ethylene-propylene copolymer containing 55 to 99.5 weight percent propylene and 0.5 to 45 weight percent ethylene.

6. The process of claim 5 wherein the olefin polymer base resin is a two-phase composition comprised of a continuous phase of highly isotactic polypropylene homopolymer and a dispersed phase of rubber-like propylene-ethylene copolymer.

7. The process of claim 1 wherein the olefin polymer base resin is HDPE having a density from 0.941 to 0.970 $g/cm^3$.

8. The process of claim 1 wherein the olefin polymer base resin is LLDPE having a density from 0.912 to 0.940 $g/cm^3$.

9. The process of claim 1 wherein the olefin polymer base resin is an ethylene polymer plastomer or elastomer using a density of 0.857 to 0.915 $g/cm^3$.

10. The process of claim 1 wherein the aromatic solvent is a toluene or xylene.

11. The process of claim 1 wherein the contacting step is carried out at a temperature from about 40° C. up to the boiling point of the aromatic solvent.

12. The process of claim 1 wherein agitation is employed for the contacting step.

13. The process of claim 1 wherein dissolution of the olefin polymer base resin and dissolution or dispersion of the organically modified clay are carried out in separate steps and the resulting solutions combined for the contacting step.

14. The process of claim 13 wherein high shear mixing is employed for dissolution or dispersion of the organically modified clay.

15. The process of claim 13 wherein a polar activator compound is present with the organically modified clay.

16. The process of claim 15 wherein the polar activator compound is selected from the group consisting of propylene carbonate, acetone, methanol and ethanol.

17. The process of claim 1 wherein the organically modified clay is first added to the aromatic solvent and, when substantially all of said organically modified clay is dissolved or dispersed, the olefin polymer is added and the contacting operation continued until substantially all of said olefin polymer is dissolved.

18. The process of claim 17 wherein high shear mixing is employed for dissolution or dispersion of the organically modified clay.

19. The process of claim 17 wherein a polar activator compound is present with the organically modified clay.

20. The process of claim 19 wherein the polar activator compound is selected from the group consisting of propylene carbonate, acetone, methanol and ethanol.

21. The process of claim 1 which includes the additional step of precipitating the olefin polymer composite and removing the bulk of the aromatic solvent by decantation or filtration prior to evaporation.

22. The process of claim 1 wherein the olefin polymer composite is dried under vacuum to evaporate the aromatic solvent.

* * * * *